(12) United States Patent
Shinde et al.

(10) Patent No.: US 11,526,629 B2
(45) Date of Patent: Dec. 13, 2022

(54) METHOD AND SYSTEM FOR PROVIDING DATA PRIVACY BASED ON CUSTOMIZED COOKIE CONSENT

(71) Applicant: Tata Consultancy Services Limited, Mumbai (IN)

(72) Inventors: Aishwarya Arun Shinde, Pune (IN); Akshay Baban Kamble, Pune (IN); Gangadhara Reddy Sirigireddy, Pune (IN); Vijayanand Mahadeo Banahatti, Pune (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 468 days.

(21) Appl. No.: 16/595,047

(22) Filed: Oct. 7, 2019

(65) Prior Publication Data
US 2020/0110904 A1    Apr. 9, 2020

(30) Foreign Application Priority Data
Oct. 8, 2018    (IN) .............................. 201821038135

(51) Int. Cl.
G06F 21/62      (2013.01)
G06N 20/00      (2019.01)
G06F 21/60      (2013.01)

(52) U.S. Cl.
CPC ........ *G06F 21/6263* (2013.01); *G06F 21/604* (2013.01); *G06F 21/6272* (2013.01); *G06N 20/00* (2019.01)

(58) Field of Classification Search
CPC ... G06N 20/00; G06F 21/604; G06F 21/6272; G06F 21/6263; G06F 16/957; H04L 63/30
See application file for complete search history.

(56) References Cited

U.S. PATENT DOCUMENTS 6,959,420 B1 * 10/2005 Mitchell ............. G06F 21/6245
                                                         715/740
7,614,002 B2 * 11/2009 Goldfeder ........... G06F 21/6245
                                                         715/740
(Continued)

FOREIGN PATENT DOCUMENTS

CN        106598750        4/2017
GB        2354854          4/2001

OTHER PUBLICATIONS

Yue, C. et al. (2010). "An automatic HTTP cookie management system," *Computer Networks*, vol. 54; pp. 2182-2198.

*Primary Examiner* — Lynn D Feild
*Assistant Examiner* — Saad Ahmad Abdullah
(74) *Attorney, Agent, or Firm* — Finnegan, Henderson, Farabow, Garrett & Dunner LLP

(57) ABSTRACT

The disclosure herein describes a method and a system for providing data privacy based on customized cookie consent. The proposed customized cookie consent system enables user's data privacy by facilitating the user to customize a plurality of features for each individual cookie, wherein a cookie is customized for multiple features that includes a consent and expiry customization, a drill down at individual cookie, an online masking unmasking cookie data—an offline masking-unmasking cookie data, a consent lineage and a data subject rights for cookie data that further include data access, data portability, right to erasure based on machine learning techniques. Further the customized cookie consent system also provides recommendation for data privacy and obscured cookies using machine learning techniques.

13 Claims, 15 Drawing Sheets

(56) References Cited

U.S. PATENT DOCUMENTS

| | | | |
|---|---|---|---|
| 8,166,406 B1* | 4/2012 | Goldfeder | G06F 21/6263 |
| | | | 709/224 |
| 10,691,834 B2* | 6/2020 | Katikala | H04L 9/0643 |
| 10,747,787 B2* | 8/2020 | Reshadi | H04L 67/02 |
| 2017/0207916 A1* | 7/2017 | Luce | G06F 21/6254 |
| 2019/0149626 A1* | 5/2019 | Shah | G06N 5/003 |
| | | | 706/12 |
| 2019/0213283 A1 | 7/2019 | Benkreira et al. | |
| 2020/0028926 A1* | 1/2020 | Sprague | H04L 9/0897 |
| 2020/0320406 A1* | 10/2020 | Antonatos | G06F 21/6254 |
| 2020/0382554 A1* | 12/2020 | McCarty | G06F 21/6263 |
| 2021/0192082 A1* | 6/2021 | Jones | G06F 21/60 |
| 2021/0243262 A1* | 8/2021 | Dudmesh | G06Q 30/0615 |

* cited by examiner

FIG. 4

Cookie Scan Results

Website Name: www.abc.com

Cookie List:

| Cookie name | Domain | Path | Recommended category |
|---|---|---|---|
| Cookie1 | test | test | Necessary |
| Cookie2 | test | test | Analytics |
| Cookie3 | test | test | Preference |
| Cookien-1 | test | test | Marketing |
| Cookien | test | test | Unclassified |

Other fields can be added

Recommendation after scanning the website

FIG. 5

Configuration of cookies

Website Name: www.abc.com

Cookie List

| Cookie name | Domain | Path | Category | Purpose | Other cookie fields |
|---|---|---|---|---|---|
| Cookie1 | test | test | Necessary | test | test |
| Cookie2 | test | test | Analytics | test | test |
| Cookie3 | test | test | Preference | test | test |
| Cookien-1 | test | test | Marketing | test | test |
| Cookien | test | test | Unclassified | test | test |

Edit    Close

| Cookie name | Purpose | Category | Consent | Consent date | Consent expiry |
|---|---|---|---|---|---|
| Cookie3 | test | Marketing | Approved | 22/09/2019 | 22/09/2020 |
| Cookie2 | test | Analytics | Denied | 22/09/2019 | 22/09/2020 |
| Cookie3 | test | Marketing | Denied | 22/09/2019 | 22/09/2020 |
| Cookien-1 | test | Preference | Approved | 22/09/2019 | 22/09/2020 |
| Cookien | test | Unclassified | Denied | 22/09/2019 | 22/09/2020 |

For this marketing type cookie, you have changed the consent from approved to denied. Consider this preference while giving consent for other marketing type cookies.

Cookie Consent | Cookie Consent Lineage | Data Subject Rights

FIG. 10

Data Subject Rights

| Data Access | Data Portability | Right to Erasure |

| Cookie name | Value | Category | Domain | Path | Cookie expiry |
|---|---|---|---|---|---|
| Cookie3 | test | Marketing | test | test | 22/09/2020 |
| Cookie2 | test | Analytics | test | test | 22/09/2020 |
| Cookie3 | test | Marketing | test | test | 22/09/2020 |
| Cookien-1 | test | Preference | test | test | 22/09/2020 |
| Cookien | test | Unclassified | test | test | 22/09/2020 |

FIG. 11

METHOD AND SYSTEM FOR PROVIDING DATA PRIVACY BASED ON CUSTOMIZED COOKIE CONSENT

CROSS-REFERENCE TO RELATED APPLICATIONS AND PRIORITY

The present application claims priority from Indian provisional patent application no. 201821038135, filed on Oct. 8, 2018.

TECHNICAL FIELD

The disclosure herein generally relates to data privacy, and more particularly, to a method and a system for providing data privacy based on customized cookie consent.

BACKGROUND

Digital and internet world comprises of exhaustive types of data that also includes personal information. In today's competitive digital world, to enable innovative solutions and improvement in existing services for customers, the exhaustive personal data is collected, stored and coupled with emerging techniques of big data and analytics to performing analytics, market decisions, and research. The personal data can be collected from the digital internet by several ways, of which cookies are most popular.

A cookie (called an Internet or Web cookie) is message that is given to a web browser by a web server. The main purpose of a cookie is to identify users and prepare customized web pages based on a user's preference history for which the user's actions and behavior are continuously tracked/monitored. However, as user information is saved and tracked, the collection of data from internet are growing concerns to ensure the user's data privacy.

Data privacy, also called information privacy, is an aspect of information technology (IT) is the ability an organization or individual to determine what data in a computer system can be shared with third parties, through internet. Cookies are among the popular techniques to track data that can potentially be connected or signaled out to identify or track a person, hence cookie consent in accordance with the regulations is important to ensure data privacy. Further various digital privacy policies such as ePrivacy regulation and GDPR (General Data Protection Regulation) also mandates end user's consent for cookie's used for any entity to ensure end user's data privacy. However, the challenge of data privacy is to protect the user's privacy preferences and their personally identifiable data while also collecting-utilizing essential data to benefit the owner of the digital application as well as the user.

SUMMARY

Embodiments of the present disclosure present technological improvements as solutions to one or more of the above-mentioned technical problems recognized by the inventors in conventional systems. For example, in one embodiment, a method for providing data privacy based on customized cookie consent is provided. The proposed customized cookie consent system enables user's data privacy by facilitating the user to customize a plurality of features for each individual cookie, wherein a cookie is customized for multiple features that includes a expiry customization, a drill down at individual cookie, an online masking unmasking cookie data—an offline masking-unmasking cookie data, a consent lineage and a data subject rights for cookie data that further include data access, data portability, right to erasure based on machine learning techniques. Further the customized cookie consent system also provides recommendation for data privacy and obscured cookies using machine learning techniques.

In another aspect, a method for providing data privacy based on customized cookie consent is provided. The method includes registering an entity for the customized cookie consent, wherein the registration includes configuring a cookie consent banner for each of a plurality cookies individually for a plurality of features. The method further includes displaying the configured cookie consent banner to a user, when the user logs into the entity. The method further includes customizing the configured cookie consent banner to get a customized cookie consent for registered plurality of features for each of the plurality of cookies based on the data privacy preference selected by the user. The method further includes saving the configured cookie consent banner and the customized cookie consent as a recommendation data. The method further includes recommending a new configured cookie consent banner and a new customized cookie consent from the saved recommendation data using machine learning techniques for subsequent registration and customizing cookie consent banner. The method further includes scanning and detecting an obscured cookie during the registration of the entity for customized cookie consent and during the customizing cookie consent banner, wherein a obscured cookie action is recommended using the saved recommendation data to the entity and the user respectively for the scanned-detected obscured cookie and displaying a centralized report comprising cookie consent banner and customized cookie consent.

In another aspect, a system for providing data privacy based on customized cookie consent is provided. The system also referred to as a customized cookie consent system comprises a cookie consent banner that is configured for registering and saving an entity for the customized cookie consent using a scanning module, a category configurator and a historic database. The customized cookie consent system further comprises a customized cookie consent configured for customizing the configured cookie consent banner to get a customized cookie consent for registered plurality of features based on the data privacy preference selected by the user using a consent and expiry customization module for expiry customization, a cookie drill down customizer module for drilling down individual cookie, a masking-unmasking module for online masking unmasking cookie data—an offline masking-unmasking cookie data, a consent lineage module for consent lineage and a data subject rights module for data subject rights for cookie data. The customized cookie consent system further comprises a cookie consent recommendation database configured for saving the configured cookie consent banner and the customized cookie consent as a recommendation data and recommending a configured cookie consent banner and a customized cookie consent from the saved recommendation data using machine learning techniques for subsequent registration and customizing cookie consent banner. The customized cookie consent customized cookie consent system further comprises an recommendation database configured for scanning and detecting an obscured cookie during the registration of the entity for customized cookie consent and during the customizing cookie consent banner, wherein a obscured cookie action is recommended using the saved recommendation data to the entity and the user respectively for the scanned-detected obscured cookie. The customized cookie consent system further comprises a display module configured for displaying a centralized report comprising cookie consent banner and customized cookie consent.

In yet another aspect, a non-transitory computer readable medium for providing data privacy based on customized cookie consent is provided. The program includes registering an entity for the customized cookie consent, wherein the registration includes configuring a cookie consent banner for each of a plurality cookies individually for a plurality of features. The program further includes displaying the configured cookie consent banner to a user, when the user logs into the entity. The program further includes customizing the configured cookie consent banner to get a customized cookie consent for registered plurality of features for each of the plurality of cookies based on the data privacy preference selected by the user. The program further includes saving the configured cookie consent banner and the customized cookie consent as a recommendation data. The program further includes recommending a new configured cookie consent banner and a new customized cookie consent from the saved recommendation data using machine learning techniques for subsequent registration and customizing cookie consent banner. The program further includes scanning and detecting an obscured cookie during the registration of the entity for customized cookie consent and during the customizing cookie consent banner, wherein a obscured cookie action is recommended using the saved recommendation data to the entity and the user respectively for the scanned-detected obscured cookie and displaying a centralized report comprising cookie consent banner and customized cookie consent.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4 illustrates scanning an entity to a dynamic level to extract details of all the cookies present in the entity according to some embodiments of the present disclosure.

FIG. 5 illustrates dynamically categorizing the scanned cookies in the entity according to some embodiments of the present disclosure.

FIG. 6 illustrates a plurality of categorized cookies saved along with their respective extracted details according to some embodiments of the present disclosure.

FIG. 9 illustrates customization of offline masking-unmasking cookie data feature enables customized masking-unmasking according to some embodiments of the present disclosure.

FIG. 10 illustrates the customization of consent lineage feature according to some embodiments of the present disclosure.

FIG. 11 illustrates data subject rights for cookie data according to some embodiments of the present disclosure.

DETAILED DESCRIPTION OF EMBODIMENTS

Figure 1:
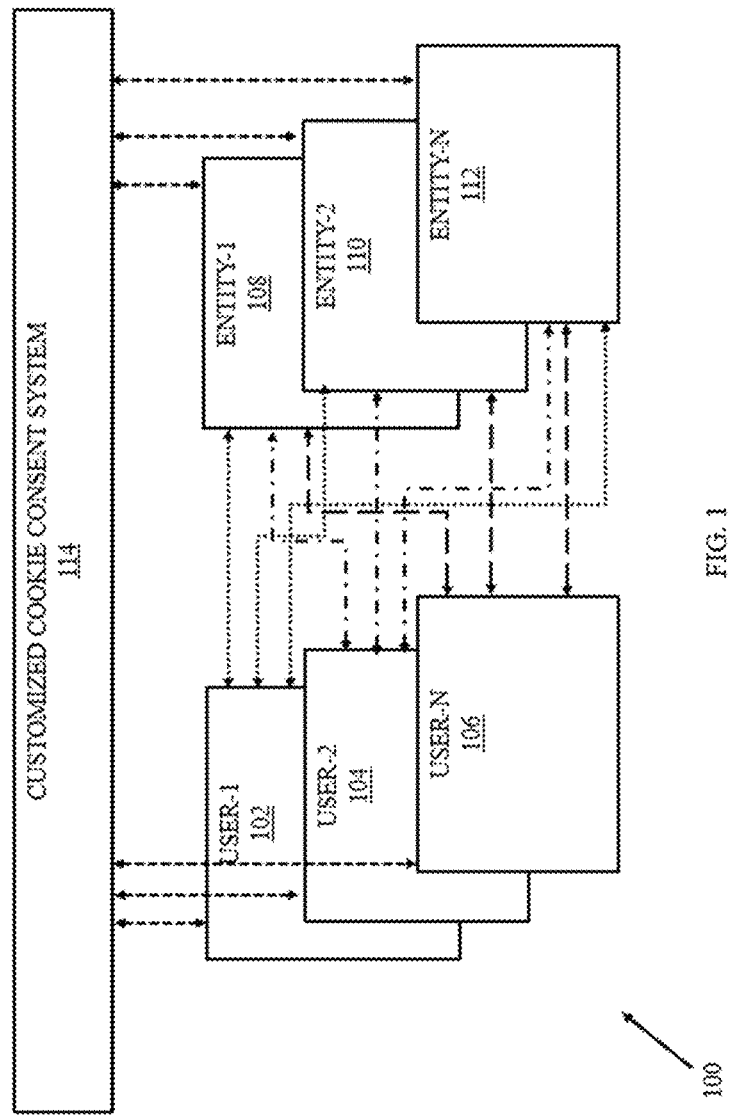
FIG. 1 illustrates an exemplary system for communication between a plurality of users, plurality of entities and a customized cookie consent system according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 14A and FIG. 14B, where similar reference characters denote corresponding features consistently throughout the figures, there are shown preferred embodiments and these embodiments are described in the context of the following exemplary system and/or method.

FIG. 1 illustrates an exemplary system for communication between a plurality of users, plurality of entities and a customized cookie consent system according to an embodiment of the present disclosure. In an embodiment, the customized cookie consent system includes a plurality of users that include a user-1 102, a user-2 104 and a user-N 106, a plurality of entities that include an entity-1 108, an entity-2 110 and an entity-2 112 and a customized cookie consent system 114. The proposed customized cookie consent system 114 is in constant communication with the plurality of users and the plurality of entities to enable data privacy based on customized cookie consent, which is explained in detail in the later sections. In an embodiment, the FIG. 1 can be implemented in a variety of computing systems, such as laptop computers, notebooks, hand-held devices, workstations, mainframe computers, servers, a network cloud and the like.

In an embodiment, the plurality of users that include user-1 102, user-2 104 and user-N 106, wherein the plurality of users include humans, machines, devices that utilizes an entity.

In an embodiment, the entity-1 108, the entity-2 110 and the entity-2 112 is plurality of entities that include a software based application, a websites, a mobile phone applications that comprises of a plurality of cookie wherein the plurality of cookies include a preference/functionality cookies, a necessary cookies, analytics/statistics cookies, a third party cookies that include advertising/marketing cookies and unclassified cookies.

In an embodiment, the preference/functionality cookies are used for storing user actions/preferences for the functionality/service provided on the entity for which use case examples include a preference/functionality cookie for saving user settings such as layout, font size, preferences, colors, language or a preference/functionality cookie for saving user choice for a query such as not to be asked again to fill in a questionnaire/survey or to display a specific page of the website. Further the necessary cookies are essential for maintaining sessions or for storing some log-in information that store a unique identifier to identify users on the entity for which use case examples include a necessary cookies for remembering previous actions of user such as purchases added to "shopping carts" or when navigating back to a page in the same session or necessary cookies for managing security tokens within an entity to identify the user's log-in status. Further the analytics/statistics cookies used for performance and improvement the entity for which use case examples include a analytics/statistics cookies for web analytics where in the data collected is limited to the website operator's use only or for managing the performance and design of the entity or a analytics/statistics cookies for advertisement response rates wherein the collected data is used for calculating response rates to improve the effectiveness of advertising displayed on the entity. Further the third party cookies that include advertising/marketing cookies could be first or third party cookies, wherein first part cookies belong the same entity, while the third part cookies belong to a different entity. The third party cookies are persistent cookies, that are very difficult to control with a pre-defined expiration time limit and are used to distinguish an individual users' browsing habits or preferences for tracking purpose as a part of advertising network to measure effectiveness of ads in a particular campaigns. A few use case examples for third party cookies include a third party cookie to collect browsing habits in order to target relevant advertisements to the user also known as retargeting.

Figure 2:
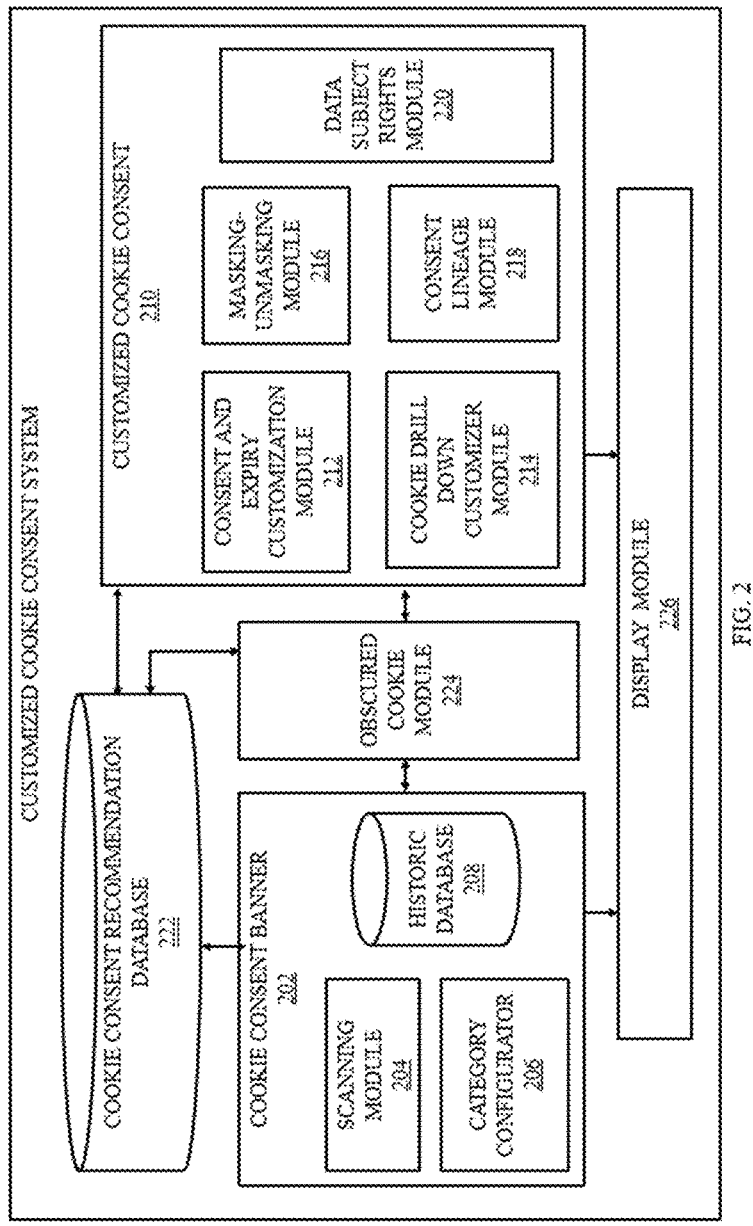
FIG. 2 is a functional block diagram for providing data privacy based on customized cookie consent according to some embodiments of the present disclosure.

The customized cookie consent system of FIG. 2, with reference to FIG. 1, is a block diagram of customized cookie consent system 114 of FIG. 1 for providing data privacy based on customized cookie consent in accordance with an embodiment of the present disclosure. In an embodiment of the present disclosure, the customized cookie consent system comprises a cookie consent banner 202 that is configured for registering and saving an entity for the customized cookie consent using a scanning module 204, a category configurator 206 and a historic database 208. The customized cookie consent customized cookie consent system further comprises a customized cookie consent 210 configured for customizing the configured cookie consent banner to get a customized cookie consent for registered plurality of features based on the data privacy preference selected by the user using a consent and expiry customization module 212 for expiry customization, a cookie drill down customizer module 214 for drilling down individual cookie, a masking-unmasking module 216 for online masking unmasking cookie data—an offline masking-unmasking cookie data, a consent lineage module 218 for consent lineage and a data subject rights module 220 for data subject rights for cookie data. The customized cookie consent system further comprises a cookie consent recommendation database 222 configured for saving the configured cookie consent banner and the customized cookie consent as a recommendation data and recommending a configured cookie consent banner and a customized cookie consent from the saved recommendation data using machine learning techniques for subsequent registration and customizing cookie consent banner. The customized cookie consent customized cookie consent system further comprises an recommendation database 224 configured for scanning and detecting an obscured cookie during the registration of the entity for customized cookie consent and during the customizing cookie consent banner, wherein a obscured cookie action is recommended using the saved recommendation data to the entity and the user respectively for the scanned-detected obscured cookie. The customized cookie consent system further comprises a display module 226 configured for displaying a centralized report comprising cookie consent banner and customized cookie consent.

According to an embodiment of the disclosure, the customized cookie consent system comprises the cookie consent banner 202 that is configured for registering and saving an entity for the customized cookie consent. The cookie consent banner 202 further comprise the scanning module 204, the category configurator 206 and the historic database 208.

Figure 3:
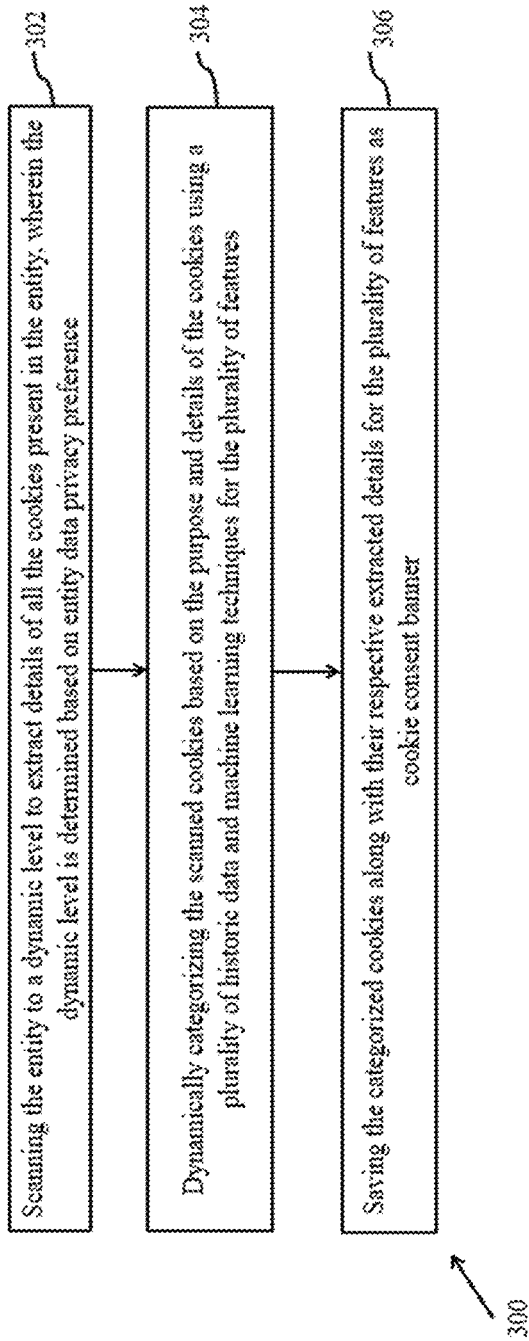
FIG. 3 exemplary flow diagram for configuring a cookie consent banner in an entity for a plurality cookies individually for a plurality of features according to some embodiments of the present disclosure.

In an embodiment, the registration includes configuring a cookie consent banner is implemented in the in the cookie consent banner 202 in multiple steps as shown in FIG. 3 is a flow diagram illustrating steps involved in a method 300 for registering an entity for the customized cookie consent, in accordance with some embodiments of the present disclosure.

Figure 4:
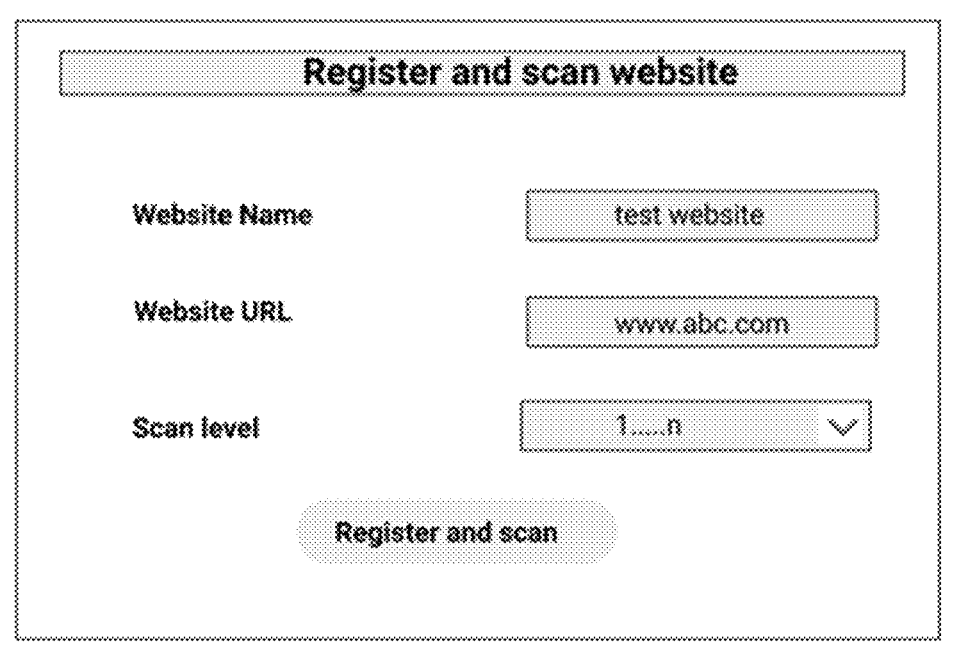

As depicted in FIG. 3, at step 302 the method 300 includes scanning the entity to a dynamic level to extract details of all the cookies present in the entity in the scanning module 204. The dynamic level is determined based on entity data privacy preference, wherein in an embodiment the data preferences is chosen based on the data privacy preference of the entity's owner. The dynamic level for scanning the entity is determined dynamically at real time based on the entity owner's privacy preference, wherein the cookie consent banner enables customization of depth of cookie information to be revealed to the customized cookie consent system is determined by the entity owner as shown in FIG. 4, wherein the owner is given an option to choose the depth for scanning the entity to a dynamic level to extract details of all the cookies. Further based on the customized depth of information to be revealed, the scanning module 204 scans the entity to a dynamic level to extract details of all the cookies present in the entity.

In an embodiment, for every depth level, the scanning module 204 sends a query to the entity, parses the received result (n) and searches for the cookie data within the parsed result. Further the parsed-searched result is converted into the format containing all the cookies and their attributes. The process continues for the received result level n, wherein n is determined by the entity owner.

At step 304, the method 300 includes dynamically categorizing the scanned cookies based on the purpose and details of the cookies using a plurality of historic data and machine learning techniques for the plurality of features in the category configurator 206. The machine learning techniques used for dynamically categorizing the scanned cookies include content based filtering, collaborative filtering, hybrid filtering, factorization machine, matrix factorization, decision trees.

In an embodiment, the machine learning techniques applied for dynamically categorizing the scanned cookies content is based filtering technique, wherein an entity name along with cookies and cookies linked with purpose, category, same site and other attributes for cookies are stored as historic data. Each time a new cookie for an entity is introduced or existing cookie for an entity is updated, the category configurator 206 queries for the similar cookie based on entity name and cookie name to finally categorize the scanned cookies dynamically by suggesting recommendations as shown in FIG. 5, wherein the cookies are dynamically categorized using a plurality of recommendations suggested.

At step 306, the method 300 includes saving the categorized cookies along with their respective extracted details for the plurality of features as cookie consent banner in the historic database 208. The historic data saved in the historic database 208 can be used for several applications that include displaying the categorized cookies along with their respective extracted details in the entity or can be used for recommendation actions or can be used for various applications of customized cookie consent xxx. In an embodiment, the categorized cookies along with their respective extracted details are saved as shown in FIG. 6.

According to an embodiment of the disclosure, the customized cookie consent system comprises the customized cookie consent 210 configured for customizing the configured cookie consent banner to get a customized cookie consent for registered plurality of features for each of the plurality of cookies based on the data privacy preference selected by the user. The customized cookie consent 210 further comprises the consent and expiry customization module 212 for expiry customization wherein expiry customization refers to customizing a expiry term for at least one cookie, the cookie drill down customizer module 214 for drilling down individual cookie, the masking—unmasking module 216 for online masking unmasking cookie data—an offline masking-unmasking cookie data, the consent lineage module 218 for consent lineage and the data subject rights module 220 for data subject rights for cookie data.

Figure 7:
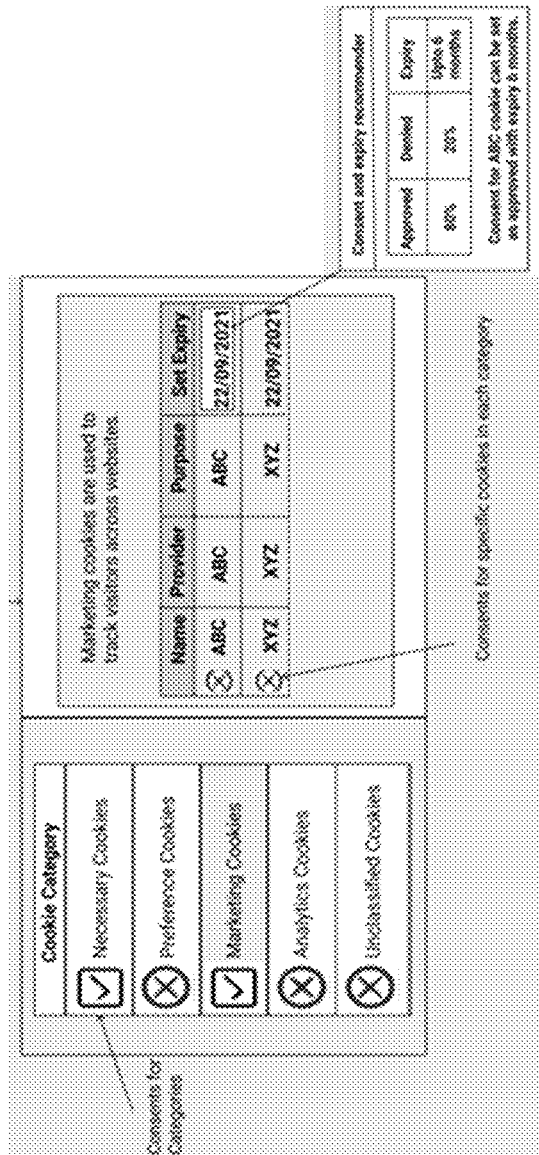
FIG. 7 illustrates an expiry customization feature that enables the user to consent or reject a cookie based on the user's time preference according to some embodiments of the present disclosure.
Figure 8:
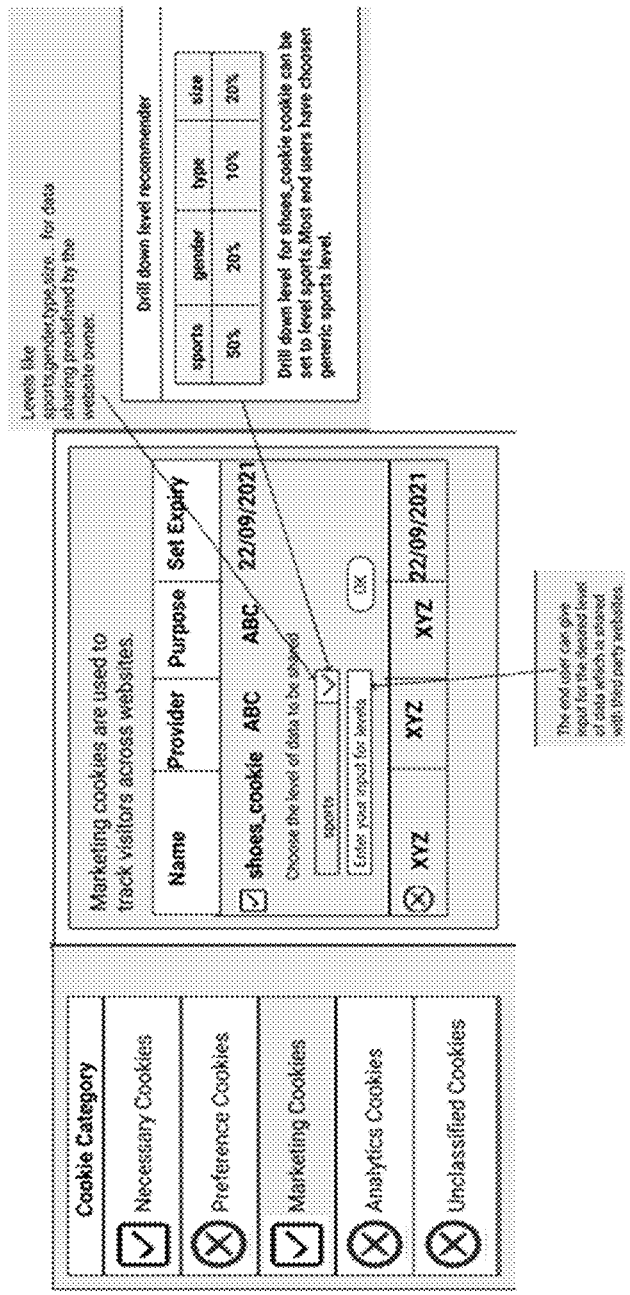
FIG. 8 illustrates customization features of drill down individual cookie feature according to some embodiments of the present disclosure.

In an embodiment, the customized cookie consent 210 comprises the consent and expiry customization module 212 to enable the consent and expiry customization feature. The expiry customization feature enables the user to consent or reject a cookie based on the user's time preference in the consent and expiry customization module 212, as shown in FIG. 7. As illustrated in FIG. 8, the user is given an option to consent or reject a cookie based on the user's time preference, wherein the user can set a expiry based on the user's time preference using a recommendation action.

In an embodiment, the consent and expiry customization feature is implemented based on a predictive analysis model, wherein the predictive analysis model is generated and further analyzed to enable the user to consent or reject a cookie based on the user's time preference. The predictive analysis model can be generated using several techniques that include data mining, machine learning and statistics. In an embodiment, the predictive model is generated in multiple steps using the historic data from the historic database 208 or from user's inputs, wherein the historic data or user's inputs are sampled, split & verified to be represented in a tree format based on decision tree algorithms.

In an embodiment, the customized cookie consent 210 comprises the cookie drill down customizer module 214 to enable the customization of drill down individual cookie feature. The includes drill down individual cookie feature enables the user to drill down to a pre-determined level of each of the plurality of cookies feature to consent or reject the cookie based on the user's data privacy preferences in the cookie drill down customizer module 214. The pre-determined level to consent or reject the cookie of the entity is determined dynamically at real time based on the user's privacy preference by the user, wherein the user can customize the extent of revealing the user's data stored in cookies based on the user's privacy preference or by using the customized cookie consent system's recommendation actions. The system assists users by recommending dynamically to drill down to a pre-determined level of each of the plurality of cookies feature to consent or reject the cookie based on the user's data privacy preferences data level using machine learning techniques, wherein the users are provided with options/levels to choose from 1 to n thereby increasing the granularity of data where the possible options/levels can be increased through user's content based analysis from users inputs thereby providing more relevant options list. The dynamically recommendations that are recommended are provide recommendation actions based on the user along with plurality of new user's privacy preference.

Considering a use case example for customization as shown in FIG. 8 for drill down individual cookie feature with a marketing cookie named "shoes_cookie" that is represented in multiple levels which can be expressed as sports-> gender-> brand->type->size. If a user choose option as "sports" while giving the consent on "shoes_cookie" then, only "sports" level data not any specific data will be shared with a third party. Further the system 100 also provides the recommendation actions for choosing the level of cookie based on filtering techniques and also provide the generation of dynamic leveling of cookie based on relevant training data set which collect from end users.

In an embodiment, the customized cookie consent 210 comprises the masking-unmasking module 216 to enable the customization of online masking-unmasking cookie data and the offline masking-unmasking cookie data feature. The customization of online masking-unmasking cookie data and the offline masking-unmasking cookie data feature enables the user to apply masking-unmasking techniques on at least one cookie to be shared with a third party in the masking-unmasking module 216, wherein the masking techniques include substitution, shuffling, character scrambling, perturbation and other masking techniques defined by the user. The substitution masking technique involves substitution of characters to mimic the look of a real cookie data, wherein an example could include a cookie value of cookie value "cookie value "abcdef" may be masked/converted as "cbedaf". Further the shuffling masking technique requires the cookie data to be shuffled in a randomized fashion such that the shuffled output set looks like authentic data but it doesn't reveal any real information of cookie, wherein an example could include a cookie1 value of cookie value "abcdef" to be shuffled with value of cookie2, wherein cookie2 is having value "uvwxyz". Further character scrambling masking technique requires the cookie data to be jumbled into a random order so that original content is not revealed using algorithms, wherein an example could include a cookie value of cookie value "abcdef" may be masked/converted as "cbedaf". The masking-unmasking module 216 also allows the user to define or configure their own masking-unmasking technique.

In an embodiment, the customization of online masking-unmasking cookie data enables the user to apply masking-unmasking techniques chosen by the user during customizing cookie consent on the cookie data when the cookies are getting dropped into the entity that could be a browser. Consider a use case example wherein the user has given consent for "cart" cookie (shared with advertising agencies)

and chosen a "character scrambling" masking technique from populated options. During online-shopping if the user add some products into the cart, then the "cart" cookie is dropped with the values scrambled using character scrambling and not as plain value, as customized by the user.

Figure 9:
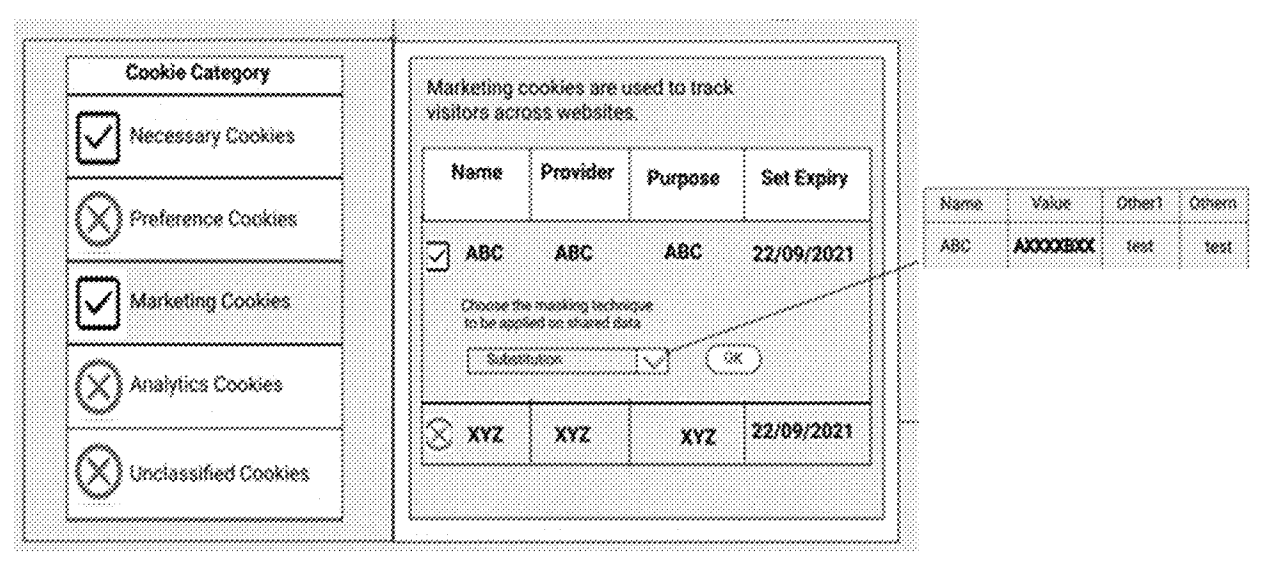

In an embodiment, the customization of offline masking-unmasking cookie data feature enables customized masking-unmasking of the cookie data to be shared with a third party with the masking technique chosen by the user. FIG. 9 illustrates an example for customization of offline masking-unmasking cookie data feature enables customized masking-unmasking, wherein the user is given an option for selecting a masking technique to mask the cookie data. Further the third party needs to use the masked cookie data, it can only unmask the data by communicating with the entity, wherein the entity will unmask the data using "unmask" functionality provided by the masking-unmasking module 216 in accordance with the user's consent. Consider a use case example wherein the end user has given the consent on a specific cookie along with a particular masking technique option, then the cookie data of the specific cookie data would be shared with third party in masked format. Further is the third party required the entity's cookie data in unmasked format then, the user is notified with the third party's request, who can decide to consent or reject, wherein for consent the masking-unmasking module 216 would unmask and share the cookie data with third party.

In an embodiment, the customized cookie consent 210 comprises the consent lineage module 218 to enable the customization of consent lineage feature. The customization of consent lineage feature is a cookie analysis based on machine learning to enable the user to consent or reject a cookie based on the user's previous preference of a cookie consent and the cookie behavior against the user's previous preference in the consent lineage module 218.

In an embodiment, the customization of consent lineage feature is implemented based on machine learning techniques that include collaborative filtering algorithm, wherein the user's previous preference of a cookie consent and the cookie behavior against the user's previous preference which is compared with a new similar cookie. The details for a plurality of cookies such as a cookie name, a category, a purpose, a consent, a consent time, a consent expiry, a cookie previous behavior post-consent that are stored in the historic database 208 or the cookie consent recommendation database 222 are compared with the new similar cookie to enable the user with consent lineage feature to finally assist the user to consent or reject a cookie. FIG. 10 illustrates the customization of consent lineage feature, wherein the user has an option to consent or reject a cookie based on the user's previous preference of a cookie consent and the cookie behavior against the user's previous preference.

In an embodiment, the customized cookie consent 210 comprises the data subject rights module 220 to enable the data subject rights for cookie data. The data subject rights for cookie data further include data access, wherein data access enables the user to view the extracted details of all the cookies present in the entity, data portability, wherein data portability generates the extracted details of all the cookies present in the entity in a machine readable format, and the right to erasure data enables the entity to remove that user's cookie data from the entity database so that the entity does not further process the cookie data.

In an embodiment, data access enables the user to access/view his/her data stored by the entity cookies for a plurality of parameters such as cookie name, cookie value and other cookie related attributes. Further for the data portability the user is enabled to generate extracted details of all the cookies present in the entity in a machine readable format that includes several formats such as comma-separated values (CSV) or portable document format (PDF) and extensible markup language (XML). Further the right to erasure data enables the entity to remove that user's cookie data from the entity database so that the entity does not further process the cookie data. The FIG. 11 illustrates data subject rights for cookie data that further include data access, data portability and the right to erasure data for each cookie.

According to an embodiment of the disclosure, the customized cookie consent system comprises the cookie consent recommendation database 222 configured for saving the configured cookie consent banner and the customized cookie consent as a recommendation data. The cookie consent recommendation database 222 also recommends a new configured cookie consent banner and a new customized cookie consent from the saved recommendation data using machine learning techniques for subsequent registration and customizing cookie consent banner.

In an embodiment, the recommendation actions are recommended by the cookie consent recommendation database 222 during the configuring cookie consent banner for same or another entity or during customized cookie consent for same or another user or for the scanned-detected obscured cookie. The recommendation actions are recommended during the configuring cookie consent banner using the saved recommendation data based on machine learning techniques.

In an embodiment, the recommendation action is recommended based on machine learning that include collaborative filtering algorithm, wherein the cookie consent recommendation database 222 which comprises exhaustive details of the configured cookie consent banner and the customized cookie consent of a plurality of user's, is compared with a new similar cookie during the configuring cookie consent banner for same or another entity or during customized cookie consent for same or another user or for the scanned-detected obscured cookie. The details for a plurality of cookies such as a cookie name, a category, a purpose, a consent, a consent time, a consent expiry, a cookie previous behavior post-consent are compared with the new similar cookie or for the scanned-detected obscured cookie to recommend a recommendation action as a new configured cookie consent banner and a new customized cookie consent.

In an embodiment, the recommendation actions are recommended by the cookie consent recommendation database 222 during the customized cookie consent for same or another user or for the scanned-detected obscured cookie. The recommendation actions are recommended during the customized cookie consent using the saved recommendation data based on machine learning techniques.

In an embodiment, for subsequent use of the entity or another entity, the customizing of cookie consent banner for performed for all the plurality of features including the expiry customization, the drill down individual cookie, the online masking unmasking cookie data—an offline masking-unmasking cookie data, the consent lineage and the data subject rights for cookie data that further include data access, data portability, right to erasure. In an embodiment, for subsequent use of the entity or another entity, the customizing of cookie consent banner for expiry customization feature a recommendation actions is recommended from the saved recommendation data using machine learning techniques. Further for subsequent use of the entity or another entity, the customizing of cookie consent banner for each of the drill down individual cookie a recommendation actions is recommended from the saved recommendation data using machine learning techniques. Further for subsequent customizing of cookie consent banner for each of the online masking-unmasking cookie data a recommendation actions is recommended from the saved recommendation data using machine learning techniques.

According to an embodiment of the disclosure, the customized cookie consent system comprises the recommendation database 224 configured for scanning and detecting an obscured cookie during the registration of the entity for customized cookie consent and during the customizing cookie consent banner, wherein a obscured cookie action is recommended using the saved recommendation data to the entity and the user respectively for the scanned-detected obscured cookie.

Figure 12:
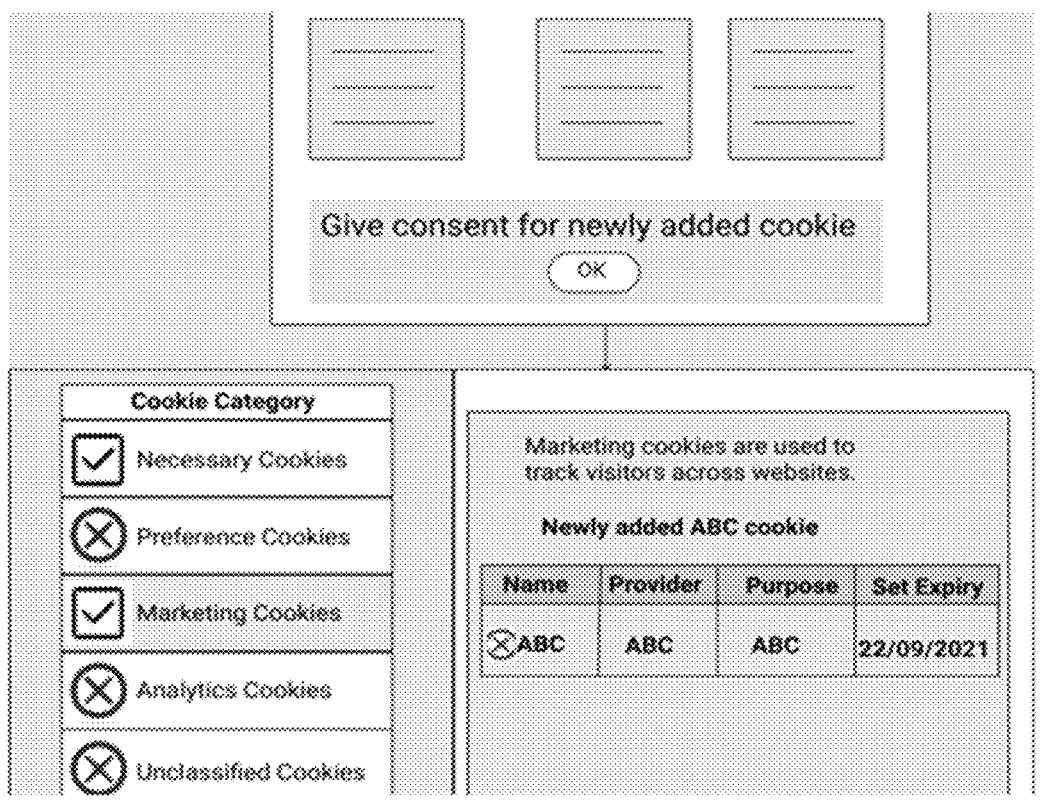
FIG. 12 illustrates an obscured cookie recommendation action according to some embodiments of the present disclosure.

An obscured cookie is a cookie generated dynamically at real-time by the entity or as a consequence of the user action on the entity, wherein the obscured cookie include a preference/functionality cookie, a necessary/mandatory cookie, analytics/statistics cookie, a third party cookie that include advertising/marketing cookie and unclassified cookie. A dynamically generated obscured cookie is detected by the recommendation database 224 using a filter, wherein a filter includes a web filter trapping request and response sequences from a client and server or a web filter from a web browser to a web server for capturing a plurality of cookies. The filter in the recommendation database 224 is compares the obscured cookie with cookie data in the historic database 208 and the cookie consent recommendation database 222 to find a match for the obscured cookie with the user's previous privacy consent for the cookie and the customized cookie consent of the entity. During comparison of the obscured cookie with historic cookie data of system, if a match is found then an obscured cookie action is recommended for the entity with the entity's previous customized cookie consent and to the user with the user's previous privacy consent for the cookie for the user to decide to consent or reject the obscured cookie. If a match is not found the entity and the user is notified to customize the obscured cookie. The FIG. 12 illustrates an obscured cookie action is recommended to a user based on the user's previous privacy consent for the cookie, to enable the user to decide to consent or reject the obscured cookie.

Figure 13:
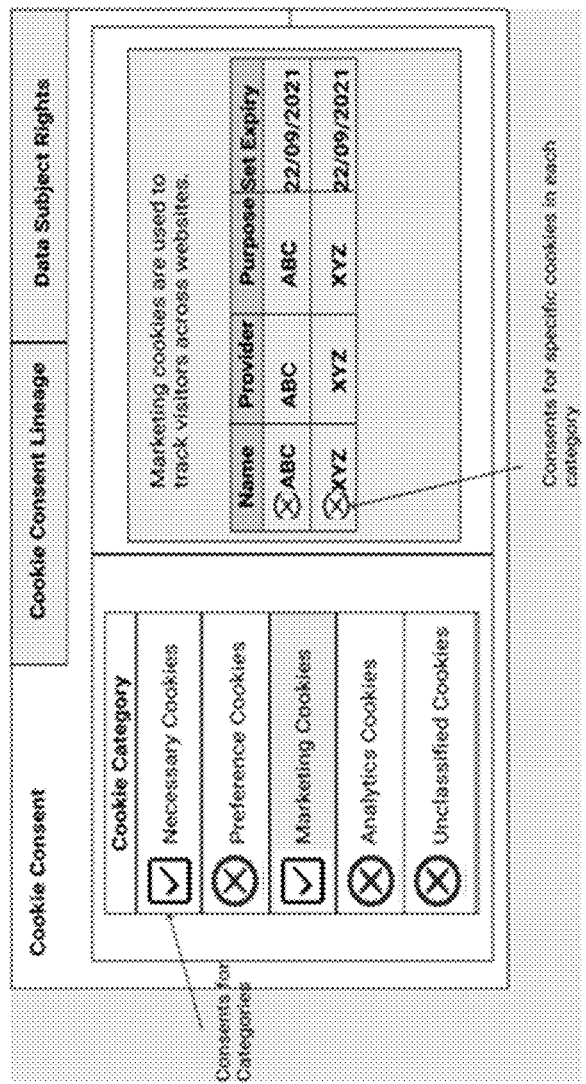
FIG. 13 illustrates an example for displaying a centralized report according to some embodiments of the present disclosure.

According to an embodiment of the disclosure, the customized cookie consent system comprises the display module 226 is configured for displaying the configured cookie consent banner to a user, when the user logs into the entity and displaying a centralized report comprising cookie consent banner and customized cookie consent. In an embodiment the display module 226 may display a cookie consent statistics for an entity or a number of users who have given approved consent/denied consent for the plurality of cookies over a time period or details of cookie consent, cookie consent lineage and data subject rights as shown in FIG. 13, for displaying a centralized report.

In an embodiment, the display module 226 can include a variety of software and hardware interfaces, for example, a web interface, a graphical subject interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

Figure 14A:
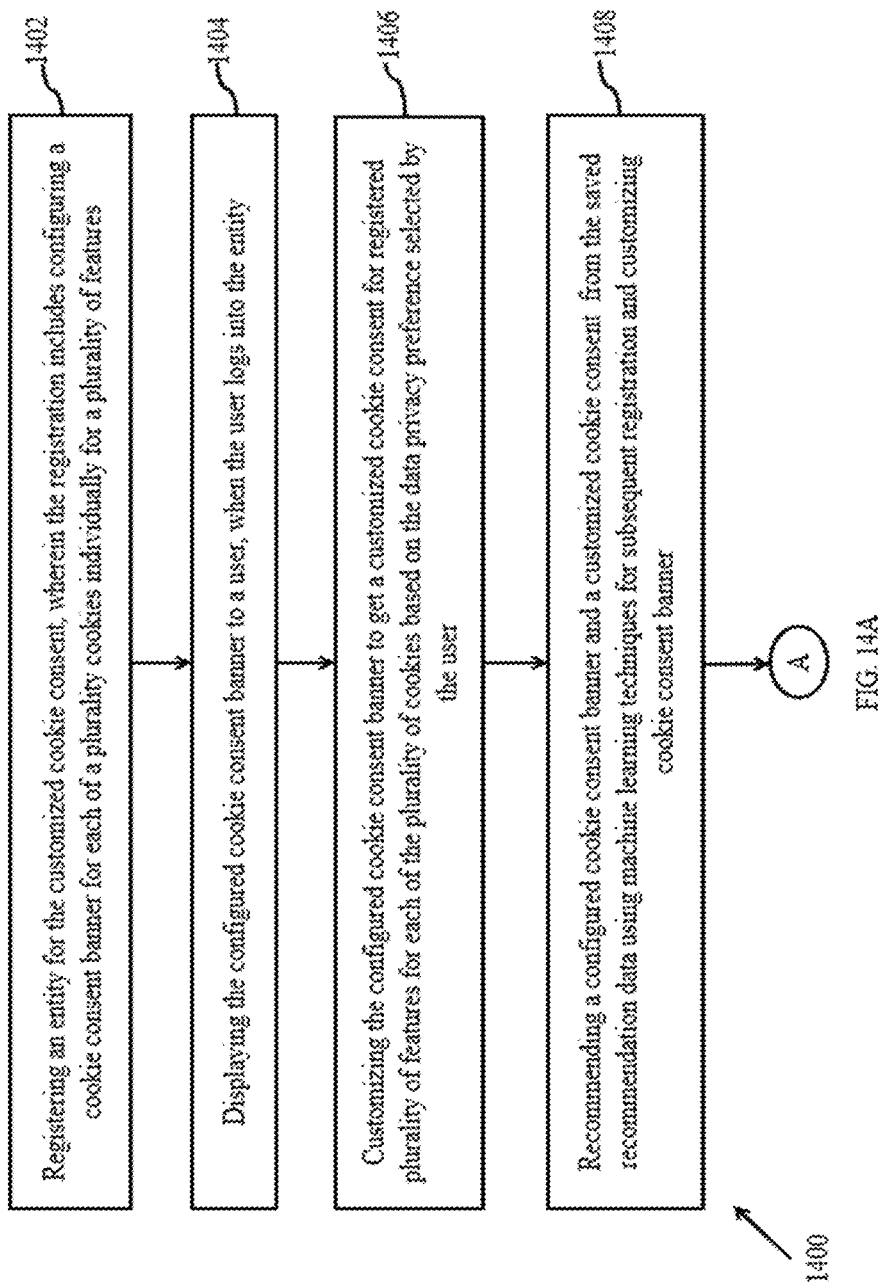
FIG. 14A and FIG. 14B is an exemplary flow diagram for providing data privacy based on customized cookie consent according to some embodiments of the present disclosure.
Figure 14B:
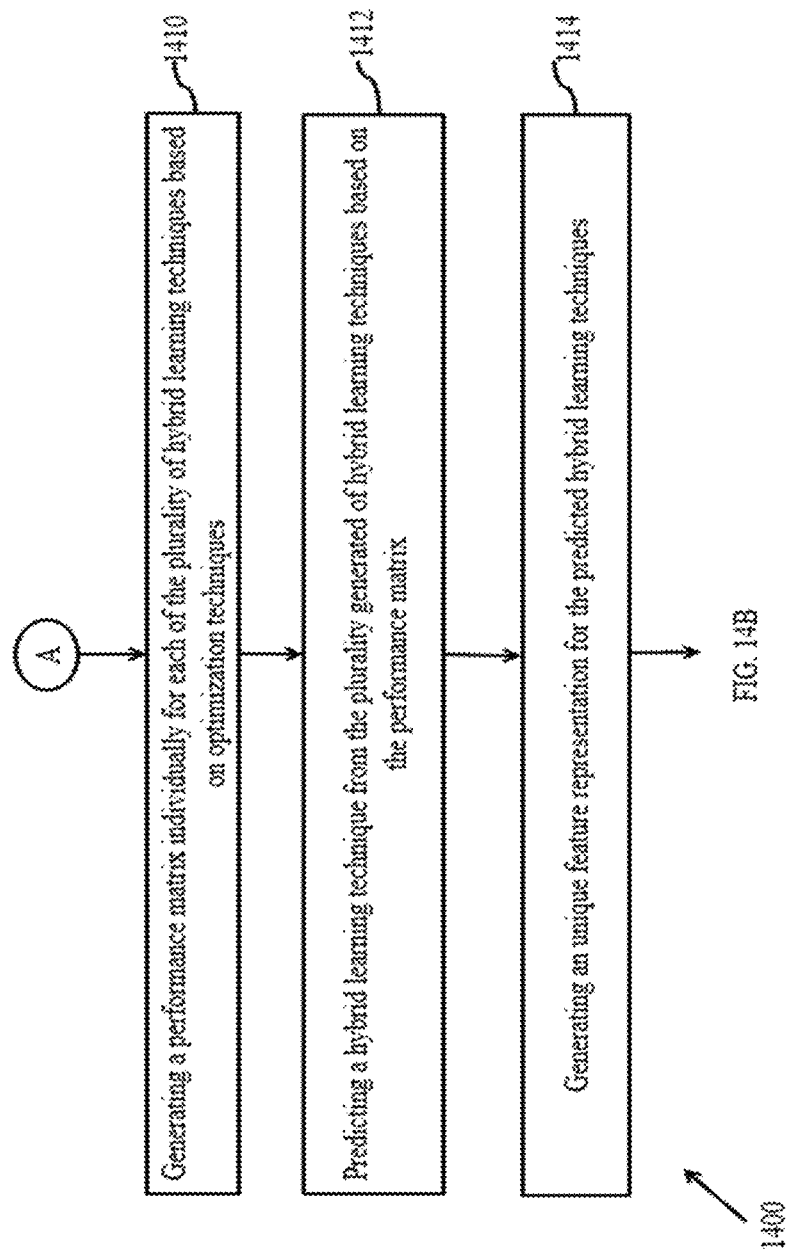

FIG. 14A and FIG. 14B is a flow diagram illustrating steps involved in a method 400 for providing data privacy based on customized cookie consent using the system of FIG. 2 in accordance with some embodiments of the present disclosure.

As depicted in FIG. 14A and FIG. 14B, at step 1402 the method 1400 includes registering an entity for the customized cookie consent in the cookie consent banner 202. The registration includes configuring a cookie consent banner for each of a plurality cookies individually for a plurality of features. Further the entity includes a software based application, a websites, a mobile phone applications that comprises of a plurality of cookies, wherein the plurality of cookies include a preference/functionality cookie, a necessary cookies analytics/statistics cookies a third party cookie that include advertising/marketing cookie and unclassified cookie. The plurality of features includes a expiry customization, a drill down individual cookie, an online masking unmasking cookie data—an offline masking-unmasking cookie data, a consent lineage and a data subject rights for cookie data that further include data access, data portability, right to erasure.

In an embodiment, registration includes configuring a cookie consent banner is implemented in multiple steps that includes scanning the entity to a dynamic level to extract details of all the cookies present in the entity, wherein the dynamic level is determined based on entity data privacy preference. Further the scanned cookies dynamically categorizing based on the purpose and details of the cookies using a plurality of historic data and machine learning techniques for the plurality of features. Finally the categorized cookies is saved along with their respective extracted details for the plurality of features as cookie consent banner.

At step 1404, the method 1400 includes displaying the configured cookie consent banner to a user, when the user logs into the entity. The configured cookie consent banner is displayed to the user on the entity's display device.

At step 1406, the method 1400 includes customizing the configured cookie consent banner to get a customized cookie consent for registered plurality of features for each of the plurality of cookies based on the data privacy preference selected by the user in the customized cookie consent xxx.

In an embodiment, plurality of features that can be customized includes a consent and expiry customization in the consent and expiry customization module 212, a drill down individual cookie in the cookie drill down customizer module 214, an online masking unmasking cookie data—an offline masking-unmasking cookie data in the masking-unmasking module 216, a consent lineage in the consent lineage module 218 and a data subject rights for cookie data in the data subject rights module 220.

In an embodiment, the consent and expiry customization feature includes enabling the user to consent or reject a cookie based on the user's time preference in the consent and expiry customization module 212. Further the drill down individual cookie feature includes enabling the user to drill down to a pre-determined level of each of the plurality of cookies feature to consent or reject the cookie based on the user's data privacy preferences in the cookie drill down customizer module 214. Further the consent lineage feature is a cookie analysis based on machine learning to enable the user to consent or reject a cookie based on the user's previous preference of cookie consent and the cookie behavior against the user's previous preference in the consent lineage module 218. Further the online masking-unmasking cookie data and the offline masking-unmasking cookie data feature includes enabling the user to apply masking-unmasking techniques on third party cookies in the masking-unmasking module 216, wherein the masking techniques include substitution, shuffling, character scrambling, perturbation and other masking techniques defined by the user.

At step 1408, the method 1400 includes saving the configured cookie consent banner and the customized cookie consent as a recommendation data in the cookie consent recommendation database 222. The configured cookie consent banner for the entity is saved as recommendation data to be used for recommendation actions during configuring cookie consent banner for same or another entity or for the scanned-detected obscured cookie. Further the customized cookie consent is saved as recommendation data to be used for recommendation actions during customized cookie consent for same or another user or for the scanned-detected obscured cookie.

At step 1410, the method 1400 includes recommending a configured cookie consent banner and a customized cookie consent from the saved recommendation data in the cookie consent recommendation database 222. The recommending action for the configured cookie consent banner and the customized cookie consent is performed using machine learning techniques for subsequent registration and customizing cookie consent banner.

In an embodiment, the recommendation actions are recommended by the cookie consent recommendation database 222 during the configuring cookie consent banner for same or another entity or for the scanned-detected obscured cookie. The recommendation actions are recommended during the configuring cookie consent banner using the saved recommendation data based on machine learning techniques.

In an embodiment, the recommendation actions are recommended by the cookie consent recommendation database 222 during the customized cookie consent for same or another user or for the scanned-detected obscured cookie. The recommendation actions are recommended during the customized cookie consent using the saved recommendation data based on machine learning techniques. In an embodiment, for subsequent use of the entity or another entity, the customizing of cookie consent banner for performed for all the plurality of features including the expiry customization, the drill down individual cookie, the online masking unmasking cookie data—an offline masking-unmasking cookie data, the consent lineage and the data subject rights for cookie data that further include data access, data portability, right to erasure At step 1412, the method 1400 includes scanning and detecting an obscured cookie during the registration of the entity for customized cookie consent and during the customizing cookie consent banner in the recommendation database 224. The obscured cookie action is recommended to the entity and the user respectively for the scanned-detected obscured cookie using the saved recommendation data cookie consent of the recommendation database 222. The obscured cookie is a cookie generated dynamically at real-time by the entity or as a consequence of the user action on the entity, wherein the obscured cookie include a preference/functionality cookie, a necessary cookie, analytics/statistics cookie, a third party cookie that include advertising/marketing cookie and unclassified cookie.

At step 1414, the method 1400 includes displaying a centralized report comprising cookie consent banner and customized cookie consent in the display module 226.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein describe method and system for providing data privacy based on customized cookie consent. The proposed customized cookie consent system enables user's data privacy by facilitating the user to customize a plurality of features for each individual cookie, wherein a cookie is customized for multiple features that includes a expiry customization, a drill down at individual cookie, an online masking unmasking cookie data—an offline masking-unmasking cookie data, a consent lineage and a data subject rights for cookie data that further include data access, data portability, right to erasure based on machine learning techniques. Further the customized cookie consent system also provides recommendation for data privacy and obscured cookies using machine learning techniques.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for providing a data privacy based on customized cookie consent, the method comprising:
   registering an entity for the customized cookie consent, wherein the registration includes configuring a cookie consent banner for each of a plurality of cookies individually for a plurality of features, wherein configuring the cookie consent banner includes:
      scanning the entity to a dynamic level to extract details of all cookies present in the entity, wherein the dynamic level is determined based on entity data privacy preference, wherein the cookie consent banner enables customization of depth of cookie information to be revealed to a customized cookie consent system, wherein an entity owner is given an option to choose the depth for scanning the entity to the dynamic level to extract the details of all the cookies and for every depth level, sending a query to the entity, parsing received result, searching for cookie data within the parsed result and converting the parsed searched result into a format containing all the cookies and cookie attributes;
      dynamically categorizing the scanned cookies based on the purpose and details of the cookies using a plurality of historic data and machine learning techniques for the plurality of features, wherein the scanned cookies are dynamically categorized using a plurality of recommendations suggested; and
      saving the categorized cookies along with their respective extracted details for the plurality of features as the cookie consent banner;
   displaying the configured cookie consent banner to a user, when the user logs into the entity;
   customizing the configured cookie consent banner to get a customized cookie consent for the registered plurality of features for each of the plurality of cookies based on the data privacy preference selected by the user;
   saving the configured cookie consent banner and the customized cookie consent as a recommendation data;
   recommending a new configured cookie consent banner and a new customized cookie consent from the saved recommendation data using machine learning techniques for subsequent registration and customizing cookie consent banner, wherein the recommending comprises comparing details of the configured cookie consent banner and the customized cookie consent from the saved recommendation data with a new similar cookie while configuring the cookie consent banner for the same entity or another entity or while configuring the customized cookie consent for the same user or another user, and wherein the details includes a cookie name, a category, a purpose, a consent, a consent time, a consent expiry, a cookie previous behavior post-consent;
   scanning and detecting an obscured cookie during the registration of the entity for customized cookie consent and during the customizing cookie consent banner, wherein a obscured cookie action is recommended using the saved recommendation data to the entity and the user respectively for the scanned-detected obscured cookie, wherein the obscured cookie is a cookie generated dynamically at real-time by the entity or as a consequence of the user action on the entity, wherein the dynamically generated obscured cookie is detected using a filter, wherein the filter includes a web filter trapping request and response sequences from a client and a server or a web filter from a web browser to a web server for capturing the plurality of cookies, and wherein the filter compares the obscured cookie with cookie data in a historic database and a cookie consent recommendation database to find a match for the obscured cookie with user's previous privacy consent for the cookie and the customized cookie consent of the entity; and
   displaying a centralized report comprising cookie consent banner and customized cookie consent.

2. The method of claim 1, wherein the entity includes a software based application, a website or a mobile phone applications that comprises of a plurality of cookies, wherein the plurality of cookies include a preference/functionality cookie, a necessary cookie, analytics/statistics cookie, a third party cookie that include advertising/marketing cookies and unclassified cookies.

3. The method of claim 1, wherein the plurality of features includes a consent and expiry customization, a drill down individual cookie, an online masking unmasking cookie data-an offline masking-unmasking cookie data, a consent lineage and a data subject rights for cookie data that further include a data access, a data portability and a right to erasure.

4. The method of claim 3, wherein the consent and expiry customization feature includes enabling the user to consent or reject a cookie based on the user's time preference, wherein for subsequent customizing of cookie consent banner for expiry customization feature a recommendation actions is recommended from the saved recommendation data using machine learning techniques, wherein the consent and expiry customization feature is implemented based on a predictive analysis model, wherein the predictive analysis model is generated using a historic data from a historic database or from user's inputs and analyzed to enable the user to consent or reject the cookie based on the user's time preference, and wherein the historic data or the user's inputs are sampled, split and verified to be represented in a tree format based on decision tree algorithms.

5. The method of claim 3, wherein the drill down individual cookie feature includes enabling the user to drill down to a pre-determined level of each of the plurality of cookies feature to consent or reject the cookie based on the user's data privacy preferences, wherein for subsequent customizing of cookie consent banner for each of the drill down individual cookie a recommendation actions is recommended from the saved recommendation data using machine learning techniques.

6. The method of claim 3, wherein the consent lineage feature is a cookie analysis based on machine learning to enable the user to consent or reject a cookie based on the user's previous preference of cookie consent and the cookie behavior against the user's previous preference.

7. The method of claim 3, wherein the online masking-unmasking cookie data and the offline masking-unmasking cookie data feature includes enabling the user to apply masking-unmasking techniques on third party cookies, wherein the masking-unmasking technique include substitution, shuffling, character scrambling, perturbation and other masking-unmasking technique defined by the user for subsequent customizing of cookie consent banner for each of the online masking-unmasking cookie data a recommendation actions is recommended from the saved recommendation data using machine learning techniques.

8. The method of claim 3, wherein the data subject rights for cookie data that further include data access, wherein data access enables the user to view the extracted details of all the cookies present in the entity, data portability, wherein data portability generates the extracted details of all the cookies present in the entity in a machine readable format, and the right to erasure data enables the entity to remove that user's cookie data from the entity database so that the entity does not further process the cookie data.

9. The method of claim 1, wherein the configured cookie consent banner for the entity is saved as recommendation data to be used for recommendation actions during configuring cookie consent banner for same or another entity or for the scanned-detected obscured cookie and the customized cookie consent is saved as recommendation data to be used for recommendation actions during customized cookie consent for same or another user or for the scanned-detected obscured cookie.

10. The method of claim 1, wherein the obscured cookie include a preference/functionality cookie, a necessary cookie, analytics/statistics cookie, a third party cookie that include advertising/marketing cookie and unclassified cookie.

11. A customized cookie consent system for providing data privacy based on customized cookie consent, the system comprising:
a cookie consent banner configured for registering and saving an entity for the customized cookie consent, wherein the registration includes configuring and saving a cookie consent banner for each of a plurality of cookies individually for a plurality of features, wherein configuring the cookie consent banner includes:
scanning the entity to a dynamic level to extract details of all cookies present in the entity, wherein the dynamic level is determined based on entity data privacy preference, wherein the cookie consent banner enables customization of depth of cookie information to be revealed to a customized cookie consent system, wherein an entity owner is given an option to choose the depth for scanning the entity to the dynamic level to extract the details of all the cookies and for every depth level, sending a query to the entity, parsing received result, searching for cookie data within the parsed result and converting the parsed searched result into a format containing all the cookies and cookie attributes;
dynamically categorizing the scanned cookies based on the purpose and details of the cookies using a plurality of historic data and machine learning techniques for the plurality of features, wherein the scanned cookies are dynamically categorized using a plurality of recommendations suggested; and
saving the categorized cookies along with their respective extracted details for the plurality of features as the cookie consent banner;
a customized cookie consent configured for customizing the configured cookie consent banner to get a customized cookie consent for registered plurality of features for each of the plurality of cookies based on the data privacy preference selected by the user;
a cookie consent recommendation database configured for:
saving the configured cookie consent banner and the customized cookie consent as a recommendation data; and
recommending a new configured cookie consent banner and a new customized cookie consent from the saved recommendation data using machine learning techniques for subsequent registration and customizing cookie consent banner, wherein the recommending comprises comparing details of the configured cookie consent banner and the customized cookie consent from the saved recommendation data with a new similar cookie while configuring the cookie consent banner for the same entity or another entity or while configuring the customized cookie consent for the same user or another user, and wherein the details includes a cookie name, a category, a purpose, a consent, a consent time, a consent expiry, a cookie previous behavior post-consent.
a obscured cookie module configured for scanning and detecting an obscured cookie during the registration of the entity for customized cookie consent and during the customizing cookie consent banner, wherein a obscured cookie action is recommended using the saved recommendation data to the entity and the user respectively for the scanned-detected obscured cookie, wherein the obscured cookie is a cookie generated dynamically at real-time by the entity or as a consequence of the user action on the entity, wherein the dynamically generated obscured cookie is detected using a filter, wherein the filter includes a web filter trapping request and response sequences from a client and a server or a web filter from a web browser to a web server for capturing the plurality of cookies, and wherein the filter compares the obscured cookie with cookie data in a historic database and a cookie consent recommendation database to find a match for the obscured cookie with user's previous privacy consent for the cookie and the customized cookie consent of the entity; and
a display module configured for displaying a centralized report comprising the cookie consent banner and the customized cookie consent.

12. The system of claim 11, wherein the customized cookie consent further comprises a consent and expiry customization module for expiry customization, a cookie drill down customizer module for drilling down individual cookie, a masking-unmasking module for online masking unmasking cookie data-an offline masking-unmasking cookie data, a consent lineage module for consent lineage and a data subject rights module for data subject rights for cookie data.

13. A computer program product comprising a non-transitory computer readable medium having a computer readable program embodied therein, wherein the computer readable program, when executed on a computing device, causes the computing device to:

registering an entity for the customized cookie consent, wherein the registration includes configuring a cookie consent banner for each of a plurality of cookies individually for a plurality of features, wherein configuring the cookie consent banner includes:

scanning the entity to a dynamic level to extract details of all cookies present in the entity, wherein the dynamic level is determined based on entity data privacy preference, wherein the cookie consent banner enables customization of depth of cookie information to be revealed to a customized cookie consent system, wherein an entity owner is given an option to choose the depth for scanning the entity to the dynamic level to extract the details of all the cookies and for every depth level, sending a query to the entity, parsing received result, searching for cookie data within the parsed result and converting the parsed searched result into a format containing all the cookies and cookie attributes;

dynamically categorizing the scanned cookies based on the purpose and details of the cookies using a plurality of historic data and machine learning techniques for the plurality of features, wherein the scanned cookies are dynamically categorized using a plurality of recommendations suggested; and saving the categorized cookies along with their respective extracted details for the plurality of features as the cookie consent banner;

displaying the configured cookie consent banner to a user, when the user logs into the entity;

customizing the configured cookie consent banner to get a customized cookie consent for registered plurality of features for each of the plurality of cookies based on the data privacy preference selected by the user;

saving the configured cookie consent banner and the customized cookie consent as a recommendation data;

recommending a new configured cookie consent banner and a new customized cookie consent from the saved recommendation data using machine learning techniques for subsequent registration and customizing cookie consent banner, wherein the recommending comprises comparing details of the configured cookie consent banner and the customized cookie consent from the saved recommendation data with a new similar cookie while configuring the cookie consent banner for the same entity or another entity or while configuring the customized cookie consent for the same user or another user, and wherein the details includes a cookie name, a category, a purpose, a consent, a consent time, a consent expiry, a cookie previous behavior post-consent;

scanning and detecting an obscured cookie during the registration of the entity for customized cookie consent and during the customizing cookie consent banner, wherein a obscured cookie action is recommended using the saved recommendation data to the entity and the user respectively for the scanned-detected obscured cookie, wherein the obscured cookie is a cookie generated dynamically at real-time by the entity or as a consequence of the user action on the entity, wherein the dynamically generated obscured cookie is detected using a filter, wherein the filter includes a web filter trapping request and response sequences from a client and a server or a web filter from a web browser to a web server for capturing the plurality of cookies, and wherein the filter compares the obscured cookie with cookie data in a historic database and a cookie consent recommendation database to find a match for the obscured cookie with user's previous privacy consent for the cookie and the customized cookie consent of the entity; and displaying a centralized report comprising cookie consent banner and customized cookie consent.

* * * * *